Nov. 10, 1959 R. W. HUGHES 2,912,509

CROSSTALK SUPPRESSION

Filed Aug. 27, 1956

INVENTOR
ROBERT W. HUGHES
BY Alfred C. Hill
AGENT

United States Patent Office 2,912,509

Patented Nov. 10, 1959

2,912,509

CROSSTALK SUPPRESSION

Robert W. Hughes, Mountain Lakes, N.J., assignor to International Telephone and Telegraph Corporation, Nutley, N.J., a corporation of Maryland Application August 27, 1956, Serial No. 606,335

7 Claims. (Cl. 179—15)

This invention relates to pulse modulation systems of the time division multiplex type and particularly to the receivers thereof.

In time division multiplex pulse systems, the marker or synchronizing pulse signal is used to control the separation of the channels and in certain systems, such as pulse time modulation systems, is also simultaneously used to control the demodulation of the channel signals. Obviously, it is necessary that the synchronizing pulse signal be stable and not subject to jitter, in order to minimize the introduction of crosstalk during distribution of the channel pulses and to prevent the introduction of distortion during the demodulation of the channel pulses. With the close spacing of pulses in modern pulse multiplex systems, distortion inherent in circuitry often causes the synchronizing pulse signal to be affected by the residual effects of preceding channel pulses, particularly those immediately ahead of it. This "crosstalk" is often produced in the circuits used to separate the marker or synchronizing from the rest of the pulse train.

An object of the present invention is the provision of an improved time division pulse multiplex system.

Another object of this invention is to provide a means for suppressing "crosstalk" between the channel signals and the synchronizing signal of a time division multiplex system.

A still further object of this invention is to provide a means for eliminating interaction between channel signals and synchronizing signal in the synchronizing signal detector circuit of a time division multiplex system.

A feature of this invention is the provision in the receiving system of a gate device responsive to the timed gate signals of certain of the channel signals to remove these channel signals from the received pulse train prior to the application of this pulse train to the synchronizing signal detector or separator. It would be possible to remove all channel signals in this manner from the received pulse train, leaving only the synchronizing signal for detection in the synchronizing signal detector. Most interference is received from the channels immediately preceding the synchronizing signal and in the system illustrated these are eliminated. Removal of these channel pulses will eliminate the crosstalk otherwise contributed by them to the synchronizing signal in the synchronizing signal detector.

Figure 1:
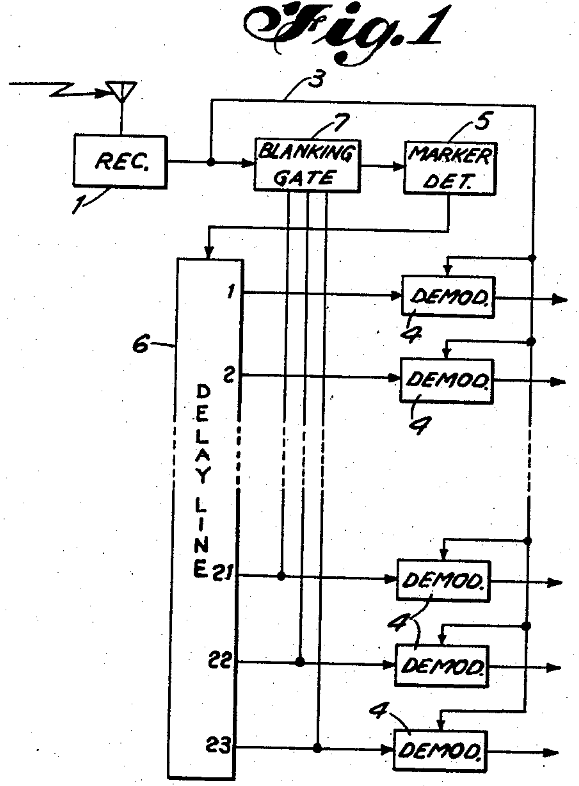
Figure 2:
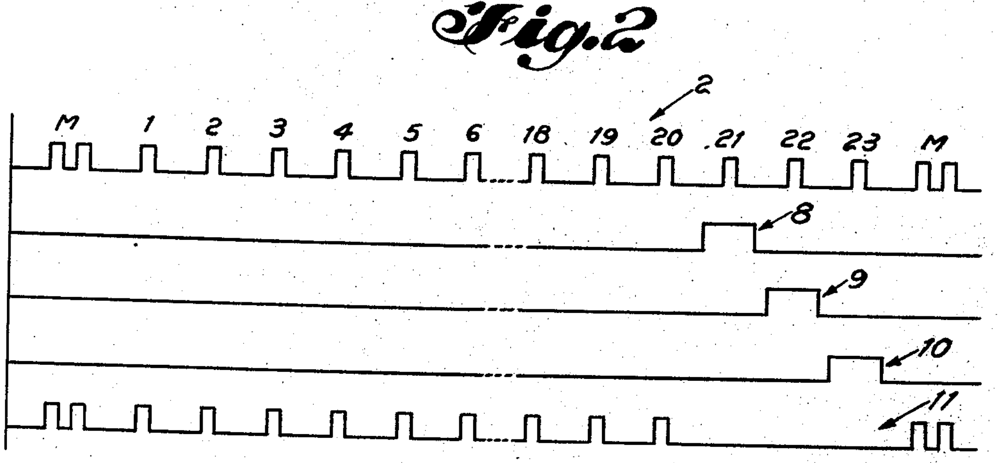

The above-mentioned and other features and objects of this invention will become more apparent by reference to the following description taken in conjunction with the accompanying drawings, in which:

Fig. 1 is a schematic diagram in block form of a time division multiplex communication system receiver in accordance with the principles of this invention; and Fig. 2 illustrates a group of curves useful in explaining the operation of the circuit of Fig. 1.

Referring to Fig. 1, the receiving terminal of a time division multiplex communication system is illustrated as including a receiver 1 for receiving, from a communication medium, a carrier signal modulated in accordance with the video signal it carries. In this instance the video signal is a pulse train including a plurality of time interleaved channel signals in the form of pulses and a distinctive synchronizing or marker signal in the form of a double pulse. The channel pulses may be time modulated. Such a video signal is illustrated by curve 2 of Fig. 2. This pulse train will appear at the output of receiver 1 and is coupled by means of conductor 3 to the plurality of demodulator and separator circuits 4 corresponding in number to the number of signal channels present in the pulse train. In the pulse train illustrated, for purposes of explanation, there are twenty-three signal channels; thus, there would be twenty-three demodulators appropriately timed from a timing signal generator to separate its corresponding channel signal from the pulse train 2 and also to recover from its channel signal the intelligence thereon.

The timing of demodulators 4 is accomplished by a timing signal generator including a synchronizing signal or marker signal detector 5 which responds to the synchronizing signal of the pulse train to produce a gate pulse. This pulse is coupled to a distributor 6 illustrated herein to be a delay line. Delay line 6 has disposed therealong at spaced intervals output taps for coupling therefrom gate pulses timed to occur at the center of each time interval allotted to its corresponding channel signal such that this channel signal could be separated from the pulse train and then demodulated for recovery of the channel intelligence.

As pointed out hereinabove, considerable crosstalk occurs in detector 5 between the channel signals and the marker or synchronizing signal. This is particularly true of the last three channel signals, that is, channels 21, 22, and 23. To eliminate the crosstalk from these three channels, it is proposed that blanking gate circuit 7 be coupled in the circuit between the receiver 1 and marker 5 and sequentially actuated by the time spaced signals of the output taps of delay line 6 corresponding to channels 21, 22 and 23. The action of the gate 7 under the influence of the timed gate pulses is to blank or remove channels 21, 22 and 23 from the pulse train prior to coupling to detector 5. Curves 8, 9 and 10, Fig. 2, illustrate the gate pulses coupled from the taps on delay line 6 of channels 21, 22 and 23 to gate 7. Curve 11, Fig. 2, illustrates the resultant pulse train coupled to the detector 5. The synchronizing signal is therein removed and a gate pulse is produced for coupling to delay line 6, the gate pulse distributor. The resultant timed pulse at the taps along line 6 provide for the separation of the channel signals present in the pulse train in the appropriate one of demodulators 4.

It will be obvious that others of the channel signals can be blanked out in gate 7 by coupling the channel timed gate pulses from the appropriate taps along delay line 6 and hence further suppress crosstalk tending to occur in marker detector 5. Employing such an arrangement, it would be possible to remove all of the channel signals and thereby apply only the marker or synchronizing signal to detector 5 and hence completely eliminate crosstalk occurring in detector 5.

While I have described above the principles of my invention in connection with specific apparatus, it is to be clearly understood that this description is made only by way of example and not as a limitation to the scope of my invention as set forth in the objects thereof and in the accompanying claims.

I claim:

1. A timing signal generator comprising a source of recurrent signals including a plurality of time spaced signals and a distinctive signal, means to detect said distinctive signal to produce a timing signal therefrom and a circuit arrangement coupling said source to the input of said distinctive signal detection means and responsive to said timing signal to remove certain of said time spaced signals adjacent said distinctive signal prior to application of said recurrent signals to the input of said detection means to thereby prevent interaction between said distinctive signal and said certain of said time spaced signals in said detection means to provide an accurately timed timing signal.

2. A timing signal generator for employment in time division multiplex receiving terminals for producing sequentially timed signals to control the separation and demodulation of correspondingly timed channel signals of a multiplex signal train including a plurality of time spaced signal channels and a synchronizing signal, comprising a synchronizing signal detector for producing from the synchronizing signal of said pulse train a gate signal and a circuit arrangement coupled to the input of said synchronizing signal detector and responsive to said gate signal to remove certain of the channel signals of said pulse, which precede said synchronizing signal prior to application of said pulse train to said synchronizing signal detector.

3. A timing signal generator for employment in time division multiplex receiving terminals for producing sequentially timed signals to control the separation and demodulation of correspondingly timed channel signals of a multiplex signal train including a plurality of time spaced signals channels and a synchronizing signal comprising a synchronizing signal detector for producing from the synchronizing signal of said pulse train a gate signal, a gating device coupling said pulse train to said synchronizing signal detector, a gate signal distributor coupled to the output of said synchronizing signal detector to distribute said gate signal as a plurality of sequentially timed signals corresponding to the time position of the channel signals of said pulse train, and means coupling certain of these timed signals from said distributor to said gating device for activation thereof to remove certain of the channel signals of said pulse train adjacent said synchronizing signal prior to application of said pulse train to said synchronizing signal detector.

4. A timing signal generator for employment in time division multiplex receiving terminals for producing sequentially timed signals to control the separation and demodulation of correspondingly timed channel pulses of a multiplex pulse train including a plurality of time spaced channel pulses and a marker pulse comprising a marker pulse detector for producing from the marker pulse of said pulse train a gate pulse, a gating device coupling said pulse train to said marker pulse detector, a delay line having a plurality of time spaced taps therealong coupled to said marker detector to distribute said gate pulse as a plurality of sequentially timed pulses corresponding to the time positions of the channel pulses of said pulse train, and means coupling certain of these timed gate pulses from said time spaced taps to said gating device for activation thereof to remove certain of the channel pulses of said pulse train adjacent said marker pulse prior to application of said pulse train to said marker pulse detector.

5. A timing signal generator for employment in time division multiplex receiving terminal for producing sequentially timed signals to control the separation and demodulation of correspondingly timed channel pulses of a multiplex pulse train including twenty-three time spaced channel pulses and a marker pulse comprising a marker pulse detector for producing from the marker pulse of said pulse train a gate signal, a gating device coupling said pulse train to said marker pulse detector, a delay line having a plurality of time spaced taps therealong coupled to said marker detector to distribute said gate pulse as sequentially timed pulses corresponding to the time positions of the channel signals of said pulse train, and means coupling timed pulses of a number of time spaced taps of said delay line corresponding to a number of time positions immediately preceding said marker pulse to said gating device for activation thereof to remove the corresponding channel pulses of said pulse train prior to application of said pulse train to said marker pulse detector.

6. A time division multiplex signal receiving terminal comprising a receiver delivering at the output thereof a pulse train including a plurality of time spaced signal channels and a synchronizing signal, a plurality of channel demodulators equal in number to the signal channels of said pulse train coupled to the output of said receiver, a gate signal distributor to sequentially time the operation of each of said demodulators for separation of their correspondingly timed signal channel from said pulse train, a synchronizing signal detector for producing from the synchronizing signal of said pulse train a gate signal, means coupling the gate signal to said distributor, a gating device coupling the input of said synchronizing signal detector to the output of said receiver, and means to couple certain timed outputs of said distributor to said gating device for activation thereof to remove correspondingly timed signal channels from said pulse train which precede said synchronizing signal prior to application of said pulse train to said synchronizing signal detector.

7. A time division multiplex signal receiving terminal comprising a receiver delivering at the output thereof a pulse train including a plurality of time spaced channel pulses and a marker pulse, a plurality of channel demodulators equal in number to the channel pulses of said pulse train coupled to the output of said receiver, a delay line having a plurality of time spaced taps therealong to provide sequentially timed gate pulses to sequentially time the operation of each of said demodulators for separation of their correspondingly timed channel pulses from said pulse train, a marker pulse detector for producing from the marker pulse of said pulse train a gate signal, means coupling the gate signal to said delay line, a gating device coupling the input of said marker pulse detector to the output of said receiver, and means to couple certain taps of said delay line, corresponding to time positions immediately preceding said marker pulse, to said gating device for activation thereof to remove correspondingly timed channel pulses from said pulse train prior to application of said pulse train to said marker signal detector.

References Cited in the file of this patent

UNITED STATES PATENTS

| | | |
|---|---|---|
| 2,537,056 | Hoeppner | Jan. 9, 1951 |
| 2,605,360 | Trevor | July 29, 1952 |
| 2,664,509 | Trevor | Dec. 29, 1953 |